United States Patent [19]
Goldman

[11] Patent Number: 5,921,714
[45] Date of Patent: Jul. 13, 1999

[54] DEVICE FOR RELEASING A SCREW JACK MECHANISM

[76] Inventor: Jerome L. Goldman, 935 Gravier St. Suite 2100, New Orleans, La. 70112

[21] Appl. No.: 08/951,981

[22] Filed: Oct. 16, 1997

[51] Int. Cl.⁶ .................. E02B 17/08; B66F 1/04
[52] U.S. Cl. .................. 405/198; 405/199; 405/290; 52/127.2; 254/95; 254/108; 403/2; 269/7
[58] Field of Search .................. 405/198, 199, 405/290; 411/915, 916; 52/127.2, 698; 254/95, 97, 108; 403/2, 40; 74/573 R; 269/7, 246

[56] References Cited

U.S. PATENT DOCUMENTS

| | | | |
|---|---|---|---|
| 3,750,853 | 8/1973 | Farr | 188/196 R |
| 3,844,002 | 10/1974 | Slemmons | 405/199 X |
| 3,979,164 | 9/1976 | Kuchnir | 269/7 X |
| 4,538,938 | 9/1985 | Grzelka et al. | 405/198 |
| 4,923,319 | 5/1990 | Dent | 403/2 |
| 5,139,366 | 8/1992 | Choate et al. | 405/198 |
| 5,215,411 | 6/1993 | Seegmiller | 405/290 |
| 5,413,436 | 5/1995 | Merz | 405/290 |
| 5,474,408 | 12/1995 | Dinitz et al. | 403/2 X |
| 5,622,422 | 4/1997 | Goldman | 405/198 |

FOREIGN PATENT DOCUMENTS 76318   5/1984   Japan ................ 405/198

*Primary Examiner*—David J. Bagnell
*Assistant Examiner*—Jong-Suk Lee
*Attorney, Agent, or Firm*—Keaty & Keaty

[57] ABSTRACT

A device for releasing of a frozen screw pressed against a contact surface uses a compression disc pre-loaded to an anticipated amount of deflection prior to mounting between the contact surface and the screw. The disc has an insert formed from a granulated material mixed with a water soluble binder, allowing to wash out the insert and cause collapse of the disc, so as to break the connection between the contact surface and the screw.

17 Claims, 3 Drawing Sheets

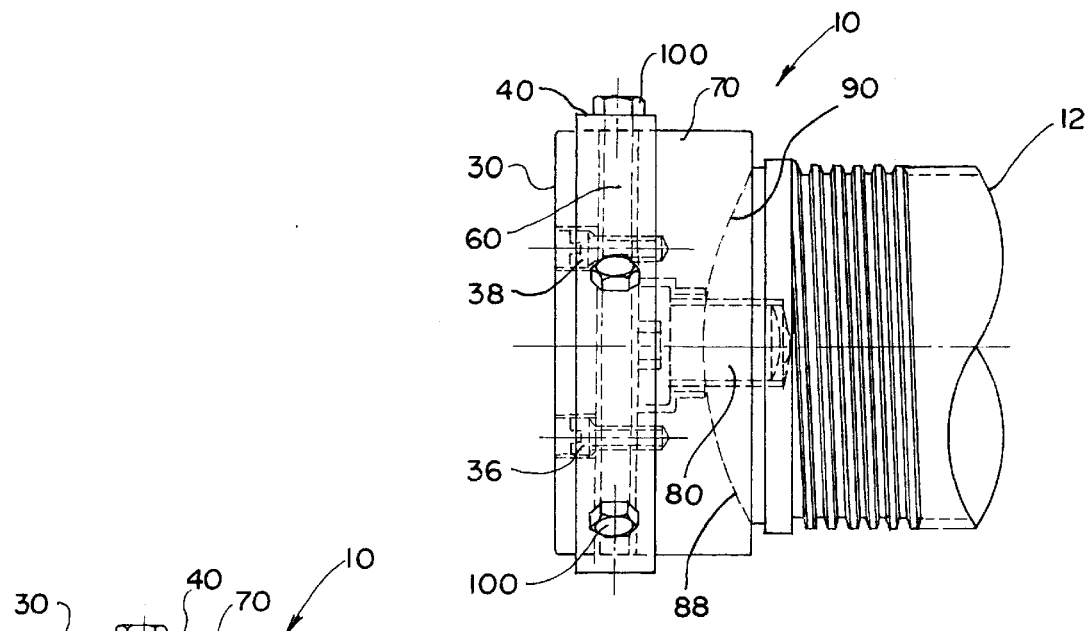
FIG. 2
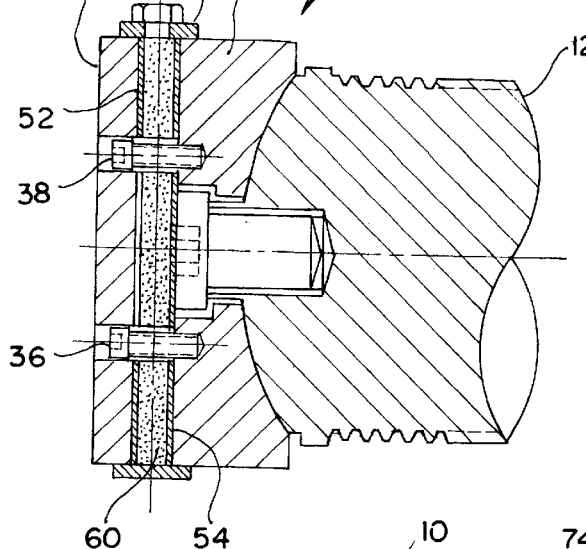
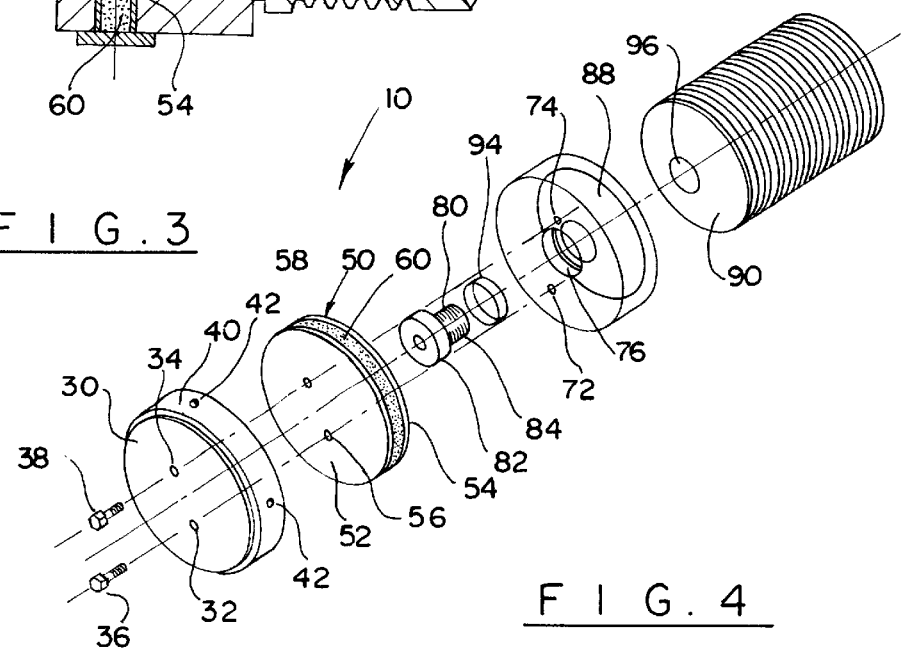
FIG. 3
FIG. 4

5,921,714

DEVICE FOR RELEASING A SCREW JACK MECHANISM

BACKGROUND OF THE INVENTION

The present invention relates to offshore equipment, and more particularly to a device for releasing engagement of a screw jack with a rack chock. Rack chock systems described in my U.S. Pat. No. 4,269,543 issued on Aug. 26, 1986 utilize a rack chock mechanism, whereby the leg and hull of an offshore platform are rigidified to enable a platform to be raised above the water waves and conduct well exploration and production operations.

In this system, the chocks are moved horizontally and vertically in relation to a leg chord with double rack teeth surfaces, ensuring that when the platform is elevated to a desired operational level, the hull is fly engaged with the legs which are embedded into the ocean floor, and that the platform does not shift in relation to the legs. The hull remains in its position of engagement with the legs for a considerable period of time. The rack chock system ensures there is a precise contact between the teeth on the leg and the teeth on the rack chock.

During that time, the surfaces of the meshed teeth are exposed to considerable pressures acting on the contact surfaces. As a result, the chocks and the teeth of the leg chord often become wedged together and conventional methods and equipment cannot generate sufficient force to break the bond between the chock and the leg chord teeth.

Conventional methods of breaking the engagement involve burning out of the jack bearing plate or cap to break the engagement. Additionally, this method is time consuming and costly, not only from the point of view of lost equipment but the downtime for an offshore rig. A lost day can run a loss of $40,000–$150,000, depending on the rig size.

The present invention contemplates elimination of the drawbacks associated with conventional methods and provision of a device for releasing a frozen screw jack in considerably less time and with less force than the above described method.

SUMMARY OF THE INVENTION

It is, therefore, an object of the present invention to provide a device for releasing a screw jack of a jack-up offshore platform.

It is another object of the present invention to provide a device that is easy to use and inexpensive to manufacture.

It is a further object of the present invention to provide a device for releasing a jack-up screw which can be pre-loaded during manufacture for anticipated amount of deflection and delivered to the offshore rig ready for installation.

These and other objects of the present invention are achieved through a provision of a device for releasing a screw, particularly screw jack pressed against contact surface of a rack chock. The device comprises a compression disc which is pre-loaded to an anticipated amount of deflection prior to positioning between the screw jack and the rack chock. The release device has an outer plate which contacts one of the plates of the disc, and the bearing plate which contacts a second plate of the compression disc.

Positioned between the disc plates is an insert comprising granulated material mixed with a water soluble binder. A protective ring is mounted about an outer circumference of the disc to prevent release of the granulated material when the disc is in use. The outer plate, the disc and the bearing plate are secured together when the release device is in use.

When it is necessary to break the connection between a frozen screw jack and a rack chock, plugs are removed from openings formed in the protective ring, and high pressure fluid, for example water under pressure, is introduced through the openings. The granulated material is washed out, causing the disc to collapse and break connection between the screw jack and the rack chock. The engagement between the release device and the screw jack can then be released, allowing to move the screw jack out of engagement with the rack chock. The collapsed disc is easily replaced, and the release device is reassembled for use.

BRIEF DESCRIPTION OF THE DRAWINGS

Reference will now be made to the drawings, wherein like parts are designated by like numerals, and wherein

FIG. 2 is a plan view of the release device in accordance with the present invention.

FIG. 3 is a cross-sectional view of the device shown in FIG. 2.

FIG. 4 is an exploded view of the release device in accordance with the present invention.

DETAIL DESCRIPTION OF THE PREFERRED EMBODIMENT

Figure 1:
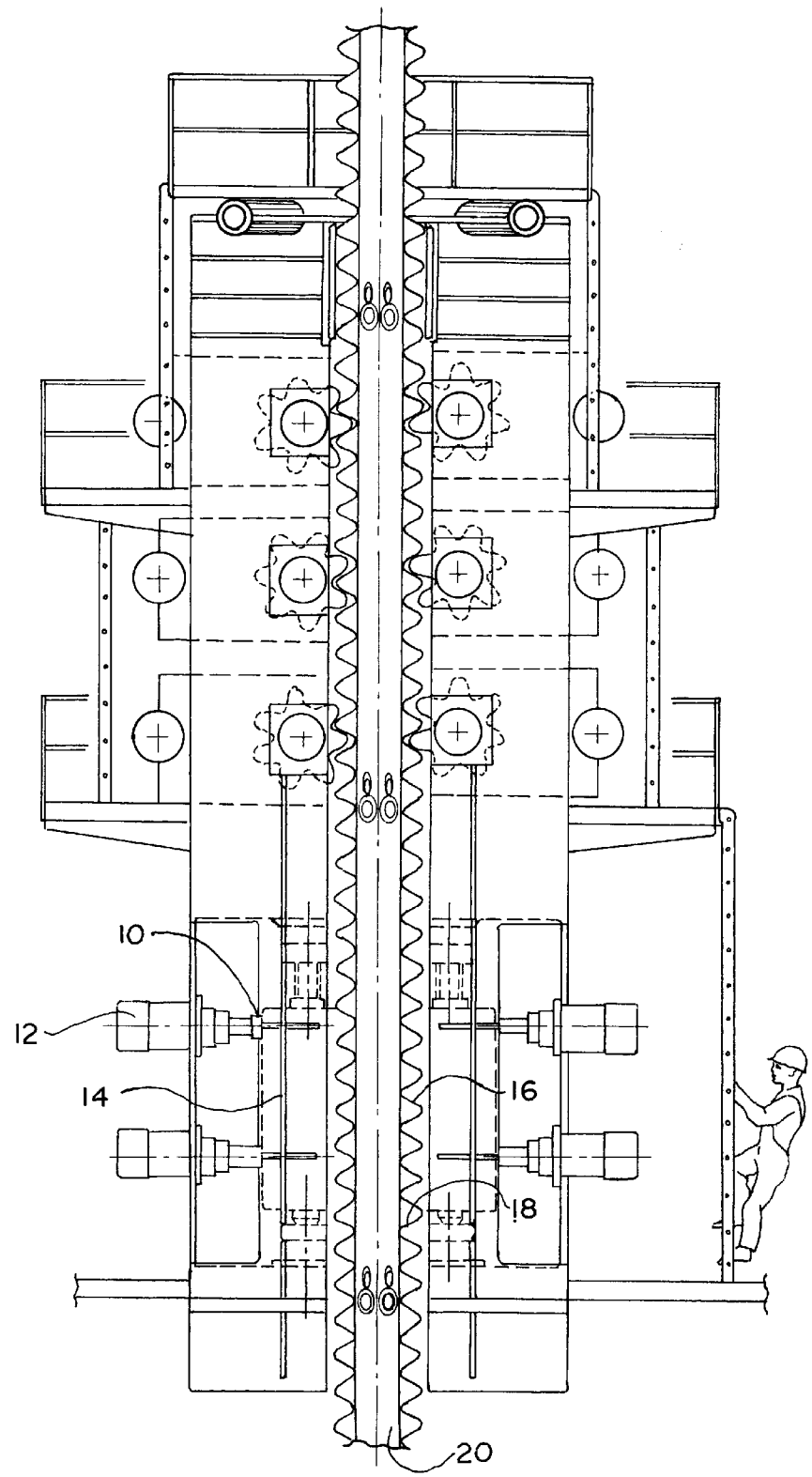
FIG. 1 is a perspective schematic view of a jack-up system where the release device of the present invention is designed to be installed.
Figure 5:
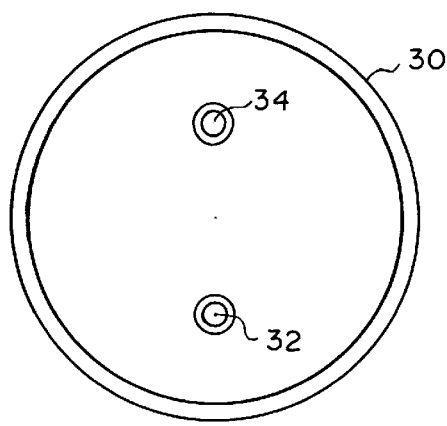
FIG. 5 is an end view of an outer plate that forms a part of the device in accordance with the present invention.

Turning now to the drawings in more detail, numeral 10 designates the release device in accordance with the present invention. As shown in FIG. 1, the device 10 is mounted between a screw jack 12 and a rack chock 14 forming a part of a jack-up system. Rack chocks 14 have a plurality of teeth 16 intermeshed with the teeth 18 of a leg chord 20.

When the screw jack 12 becomes "frozen" due to a continuous load applied on the screw jack that forces the screw into contact with the rack chock 14, conventional equipment present on an offshore platform cannot be used for mechanically breaking the engagement of the screw jack and reversing its position.

The usual technique employed heretofore was to burnout the metal pressure cap and replace it with a new cap. The device of the present invention, being mounted between the screw jack and the rack chock allows to release the frozen screw jack in fifteen minutes or less, without the use of burners or any other heat application.

Turning now to FIGS. 2–10, the release device 10 of the present invention is illustrated in more detail. As can be seen in the drawings, the device 10 comprises an outer plate 30 having a circular configuration and provided with a pair of spaced-apart apertures 32 and 34. The apertures 32 and 34 are adapted for receiving securing screws 36 and 38, respectively.

Figure 6:
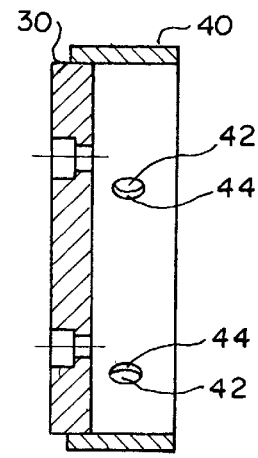
FIG. 6 is a side view of the outer plate shown in FIG. 5.
Figure 7:
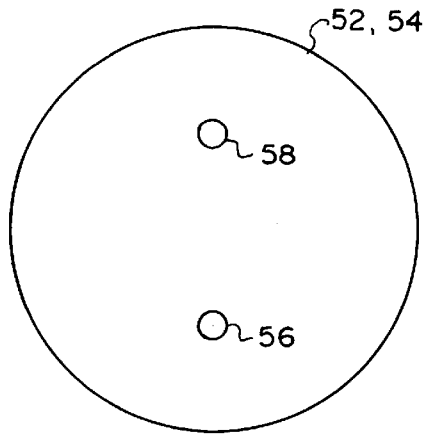
FIG. 7 is an end view of a disc that forms a part of the device of the present invention.
Figure 8:
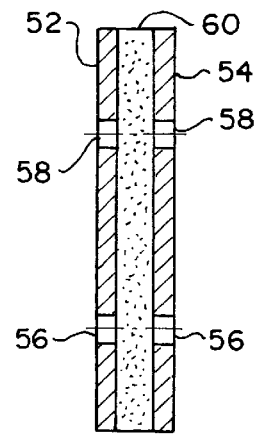
FIG. 8 is a cross sectional view of the disc shown in FIG. 7.
Figure 9:
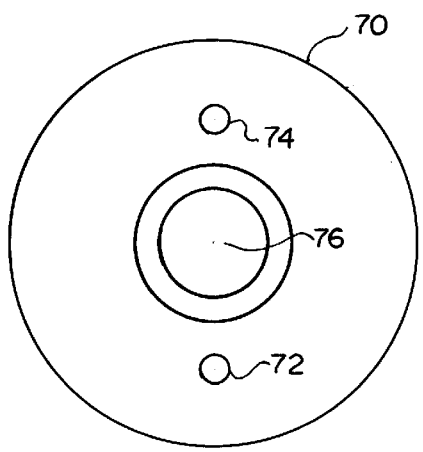
FIG. 9 is an end view of a bearing plate that forms a part of the device in accordance with the present invention.

A ring 40 is mounted about the outer circumference of the outer ring 30 and overlaps the wall of the ring, as shown in FIG. 6, to some distance. The ring 40 is formed with two or more normally closed openings 42 which are adapted to receive washout plugs therein. The plugs are received in threadable engagement with the threads 44 formed on the interior walls of the openings 42.

Fitted within the ring 40 is a compression disc 50 which is comprised of a first circular plate 52 and a second circular plate 54. Apertures 56 and 58 are formed in the plates 52 and 54, with the axes of the apertures 56 and 58 being in alignment with the apertures 32 and 34 when the disc 50 is fitted such that the first plate 52 contacts an inner surface of the outer plate 30.

The plates 52 and 54 are retained in a parallel spaced-apart relationship by an insert 60 which comprises a loose compressible granulated material 60 mixed with a water soluble binder. The insert 60 is positioned in the annular space defined by the plates 52 and 54. The loose material can be sand or other granulated, or crystallized material held in place by addition of a binding material, for example, resin and the like.

The disc is pre-loaded during manufacture to the maximum anticipated amount of deflection it will see in service, thereby imparting a permanent deflection on the plates 52 and 54, with the plates 52 and 54 being pressed together until the granular material can no longer be compressed. The disc can be repeatedly loaded and unloaded during operation of the device without undergoing further reduction in thickness. The ring 40 extends over disc 50 and protects the insert 60 preventing escape of the granulated material during normal operation of the device.

Mounted in a frictional contact with the free surface of the plate 54 is a bearing plate 70 which has a diameter substantially equal to the diameter of the outer plate 30 and the disc plates 52 and 54. The bearing plate 70 is also provided with apertures 72 and 74 a distance away from the center of the plate and in co-alignment with the apertures 32, 34, 56 and 58.

Figure 10:
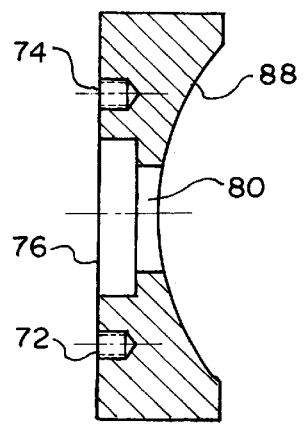
FIG. 10 is cross sectional view of the bearing plate shown in FIG. 9.

A greater diameter central opening 76 is formed in the bearing plate 70, the opening 76 receiving a securing bolt 80 therethrough. The opening 76 extends through the thickness of the bearing plate 70, as shown in FIG. 10, and has a larger diameter portion 78 and a smaller diameter portion 80 to accommodate a head of the bolt 82 and a threaded stem 84, respectively.

The bearing plate 70 is provided with an outer surface 86 which is a substantially straight, even surface, and an inner surface 88 which has an inwardly concave recess matching in radius a contact surface 90 of a jack-up screw 12.

The retainer bolt 80 is provided with a sleeve 94 that fits over a portion of the stem 84 when the device 10 is assembled. The head 82 of the bolt 80 is provided with a wrench engaging surface to allow removal of the bolt 80 when the device is disassembled. The outwardly concave surface 90 of the jack-up screw 12 is formed with a central recess 96 to receive a portion of the threaded shank 84 of the bolt 80.

During operation, the device 10 is positioned on the exterior surface of the bearing plate 70, between the jack-up screw 12 and the rack chock 14.

In the event a screw jack 12 becomes frozen due to excessive pressure exerted on the screw jacks 12, and cannot be freed by the screw turning mechanism, the device 10 is used to break the connection between these two members. One of the ring plugs 100 is removed from the openings 42, giving access to the edge of the disc 50 and the insert 60. A high pressure small diameter water lance is inserted in the plug opening, the pressure generated by the source of pressurized fluid being in the order of 1,000 pounds–10,000 pounds per square inch.

The high pressure stream attacks the compressed granular material 60 and causes the sand and the binder to wash away. When most or all sand washes out, the two plates 52 and 54 of the disc 50 can no longer sustain the pressure load. They collapse, releasing the pressure on the face of the screw jack 12, such that it no longer pushes against the rack chock 14.

A the same time, a relative distance set between the screw jack 12 and the rack chock 14 remains unchanged.

The screw jack 12 can then easily be retracted with a minimal delay sustained in the operation. A new disc 50 is fitted in the device 10, and the entire screw jack assembly is ready for reuse.

During lab tests of a unit for heavy duty jack up rig application the disc 50 was preloaded and tested up to 7.5 million pounds, with 6.5 million pounds being an anticipated maximum pressure to which the discs 50 would be exposed in a normal working environment.

It is envisioned that the water pressure of 1,000–10,000 pounds per square inch or higher can be applied to force collapse of the disc 50. During tests it took fifteen minutes to dissolve the binder and granular material 60 using 1,000 pounds per square inch water pressure. It is envisioned that as little as five minutes would be needed at water pressure of approximately 10,000 pounds per square inch.

The materials used in the device of the present application have certain physical properties. The plates, the ring, the plugs are preferably made from strong, non-corrosive metal, with the disc plates 52 and 54 having a thickness of between 1/8"–1/4". The granulated material can be sand, or other similar used material that can be retained between the discs 52 and 54 through the use of a binder suitable for such purposes.

The screw release device of the present invention is not limited in its application to offshore rigs. It can be successfully employed whenever substantial loads are applied on a holding screw causing the screw to "freeze" in its position. The device of the present invention can be positioned between a crew and a contact surface in order to provide means for releasing the screw, when necessary.

Many changes and modifications can be made in the design of the present invention without departing from the spirit thereof. I, therefore, pray that my rights to the present invention be limited only by the scope of the appended claims.

I claim:

1. A device for releasing a screw pressed into engagement with a contact surface, comprising:

a pre-compressed compression disc mounted between said contact surface and said screw, said compression disc comprising a collapsible insert which breaks connection between said contact surface and said screw when the insert collapses.

2. A device for releasing a screw pressed into engagement with a contact surface, comprising:

a compression disc mounted between said contact surface and said screw, said compression disc comprising a collapsible insert which breaks connection between said contact surface and said screw when the insert collapses, said insert comprising granulated material mixed with a binder and positioned between a pair of parallel disc plates.

3. The device of claim 2, further comprising a protection ring mounted in a covering relationship about an outer circumference of said compression disc so as to prevent release of said granulated material.

4. The device of claim 3, wherein said protection ring is provided with a plurality of openings, said openings, when open, allowing to wash out the granulated material to cause collapse of said compression disc.

5. The device of claim 4 wherein said openings are normally closed with a plurality of plugs detachably engaged in said openings.

6. A device for releasing a screw pressed into engagement with a contact surface, comprising:

a compression disc mounted between said contact surface and said screw, said compression disc comprising a collapsible insert which breaks connection between said contact surface and said screw when the insert collapses, wherein said disc is pre-loaded to an anticipated amount of deflection prior to mounting between the contact surface and the screw.

7. A device for releasing a screw pressed into engagement with a contact surface, comprising:

a compression disc mounted between said contact surface and said screw, said compression disc comprising a collapsible insert which breaks connection between said contact surface and said screw when the insert collapses; and an outer plate adapted for mounting in contact with said contact surface and a bearing plate adapted for mounting in contact with said screw, and wherein said compression disc is secured between said outer plate and said bearing plate.

8. The device of claim 7, wherein said bearing plate is detachably secured to said screw, and wherein said outer plate is detachably secured to said compression disc and said bearing plate.

9. The device of claim 7, wherein said bearing plate has an outer surface which engages said compression disc and an inner surface which engages said screw, and wherein said inner surface is formed with a recess sized and shaped to match a surface of the screw which engages said bearing plate.

10. A device for releasing a screw jack pressed into engagement with a rack chock of a jack up rig, the device comprising:

an outer plate for mounting in contact with the rack chock;

a bearing plate for mounting in contact with the crew jack; and a compression disc secured between said outer plate and said bearing plate, said compression disc comprising a collapsible insert which breaks connection between said rack chock and said screw jack when the insert collapses, while maintaining a set distance between the rack chock and the screw jack.

11. The device of claim 10, wherein said insert comprises granulated material mixed with a binder and positioned between a pair of parallel disc plates.

12. The device of claim 11, further comprising a protection ring mounted in a covering relationship about an outer circumference of said compression disc so as to prevent release of said granulated material.

13. The device of claim 12, wherein said binder is formed from a water soluble material and wherein a plurality of openings, which are normally closed, are formed in said protection ring, said openings, when open, allowing to wash out the granulated material to cause collapse of said compression disc.

14. The device of claim 13, wherein said openings are defined by threaded walls, and wherein each of the openings is adapted for sealing with a detachable plug.

15. The device of claim 10, wherein said compression disc is pre-loaded to an anticipated amount of deflection prior to mounting between the rack chock and the screw jack.

16. The device of claim 10, wherein said bearing plate is detachably secured to said screw jack, and wherein said outer plate is detachably secured to said disc and said bearing plate.

17. The device of claim 10, wherein said bearing plate has an outer surface which engages said compression disc and an inner surface which engages said crew jack, and wherein said inner surface is formed with a recess sized and shaped to match a surface of the crew jack which engages said bearing plate.

* * * * *